(12) United States Patent
Ohmura

(10) Patent No.: US 8,439,699 B2
(45) Date of Patent: May 14, 2013

(54) LEVER TYPE ELECTRICAL CONNECTOR

(75) Inventor: Takenori Ohmura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/318,183

(22) PCT Filed: Jun. 11, 2010

(86) PCT No.: PCT/JP2010/060322
§ 371 (c)(1),
(2), (4) Date: Oct. 31, 2011

(87) PCT Pub. No.: WO2010/143750
PCT Pub. Date: Dec. 16, 2010

(65) Prior Publication Data
US 2012/0045923 A1 Feb. 23, 2012

(30) Foreign Application Priority Data
Jun. 11, 2009 (JP) .................................. 2009-140422

(51) Int. Cl.
*H01R 13/62* (2006.01)
(52) U.S. Cl.
USPC .......................................... 439/372; 439/157
(58) Field of Classification Search .................. 439/372, 439/157, 310, 142, 137, 352, 136, 347, 357, 439/924.1, 489, 476.1, 503, 524, 886, 918, 439/931, 33–35
See application file for complete search history.

(56) References Cited

U.S. PATENT DOCUMENTS

| 5,350,312 A | 9/1994 | Kuno et al. |
| 5,556,284 A | 9/1996 | Itou et al. |

(Continued)

FOREIGN PATENT DOCUMENTS

| JP | 8-78095 A | 3/1996 |
| JP | 10-275653 A | 10/1998 |

OTHER PUBLICATIONS

International Search Report (PCT/ISA/210) issued on Oct. 21, 2010 in the International Patent Application No. PCT/JP2010/060322.

(Continued)

*Primary Examiner* — Renee S Luebke
*Assistant Examiner* — Harshad Patel
(74) *Attorney, Agent, or Firm* — Sughrue Mion, PLLC

(57) ABSTRACT

A lever type electrical connector has a case. A connector terminal is provided in the case so as to be slidable in a first direction, and is operable to engage with a mating connector terminal by being moved in the first direction. A handle is connected with the connector terminal. A first lever is pivotably attached to the case, and is connected to the handle. The first lever is operable to be moved so as to move the handle in the first direction. A first lock arm is pivotably attached to the case. A first end of the first lock arm is operable to be come in contact with the mating connector terminal. A second end of the first lock arm opposite to the first end is operable to be disengaged from the handle when the first end is urged from the mating connector terminal. The second end is operable to be engaged with the handle so as to prevent the handle from moving in the first direction when the first end is not urged from the mating connector terminal.

3 Claims, 18 Drawing Sheets

U.S. PATENT DOCUMENTS

| | | | | |
|---|---|---|---|---|
| 5,558,533 A | * | 9/1996 | Hashizawa et al. | 439/310 |
| 5,584,712 A | | 12/1996 | Fukushima et al. | |
| 5,816,825 A | * | 10/1998 | Sekimori et al. | 439/39 |
| 5,873,737 A | * | 2/1999 | Hashizawa et al. | 439/39 |

OTHER PUBLICATIONS

Written Opinion (PCT/ISA/237) issued on Oct. 21, 2010 in the International Patent Application No. PCT/JP2010/060322.

* cited by examiner

LEVER TYPE ELECTRICAL CONNECTOR

TECHNICAL FIELD

The present invention relates to a lever type electrical connector, including a pair of female and male connectors used for battery charge for electric vehicles, and being capable of inserting the male connector into the female connector with zero frictional resistance between connecting terminals of the male and female connectors, and specifically, relates to a lever type electrical connector capable of preventing an erroneous operation.

BACKGROUND ART

Conventional lever type electrical connectors, each of which includes a pair of female and male connectors, and is capable of performing insertion with zero frictional resistance between connecting terminals of the male and female connectors, are disclosed in detail in Patent literature: JP-A-10-275653 [PTL 1] and JP-A-08-78095 [PTL 2].

The lever type electrical connector of PTL 2 relates to an improved invention of the lever type electrical connector of PTL 1. The improved invention is directed to ground connection. For example, in a power supply connector used for battery charge for electric vehicles, earth circuits of the female and male connectors are connected to each other before power supply terminals of both the connectors contact each other so that the electrostatic charge of the connectors can be safely removed.

Therefore, specifically, in the lever type electrical connector of PTL 2 in which one of a pair of connectors which are fitted to each other is provided with a temporary lock member, the other connector is provided with a stopper to be engaged with the lock member, the temporary fitting state of both the connectors is held by the engagement between the temporary lock member and the stopper, and terminals housed in the respective connectors are brought into contact with each other by the final fitting of both the connectors to perform electrical connection. In the lever type electrical connector of PTL 2, the earth circuits are connected to each other via the lock means before the contact between the terminals by using the temporary lock member and stopper, which constitute a temporary lock means of the pair of connectors, for the earth circuits, and temporarily locking both the connectors.

However, the drawback of a low insertion force lever type connector 100 of PTL 2 is that a main lever 115 is operable in a state which the connector is not "preset" as in FIG. 17.

Here, the "preset" means that the lever type electrical connector 100 is inserted into a mating female connector 200, and a lock portion 111K of a lock arm 111 is locked to a lock portion 223K inside a tip 223 of the female connector 200.

When the main lever 115 is pulled and operated toward the near side as in FIG. 18 in a state where the lock portion 111K of the lock arm 111 is not locked to the lock portion 223K of the female connector 200, a connector body 113 including a wire harness assembly inside the connector is movable to the front as in FIG. 18, a lock portion 115R of a main lever 115 runs against a lock portion 116R of a release lever 116 in the position of the fitting state, or is locked in a connector non-fitting state. As a result, there a danger that the connector body will not be able to fit to the female-side connector 200 and that the connectors may be damaged.

SUMMARY OF INVENTION

Technical Problem

The present invention was made in view of such a problem, and the object of the present invention is to provide a lever type connector with a low insertion force which is capable of preventing an erroneous operation of a main lever so that the main lever is not operated in a state where a connector is not "preset" and the "preset" makes the main lever eventually operable, thereby preventing any damage, etc. to the connector caused by the erroneous operation of the main lever.

Solution to Problem

In order to achieve the above object, according to the present invention, there is provided a lever type electrical connector, comprising:

a case;

a connector terminal provided in the case so as to be slidable in a first direction, and configured to engage with a mating connector terminal by being moved in the first direction;

a handle connected with the connector terminal;

a first lever pivotably attached to the case, connected to the handle, and configured to be moved so as to move the handle in the first direction; and a first lock arm pivotably attached to the case, wherein a first end of the first lock arm is configured to become in contact with the mating connector terminal, wherein a second end of the first lock arm opposite to the first end is configured to be disengaged from the handle when the first end is urged from the mating connector terminal, and wherein the second end is configured to be engaged with the handle so as to prevent the handle from moving in the first direction when the first end is not urged from the mating connector terminal.

The lever type electrical connector may further include a second lock arm pivotably attached to the case, configured to be engaged with a stopper provided in the mating connector terminal, configured to be disengaged from the stopper by a movement of a second lever provided in the case, and having a first stepped portion.

The lever type electrical connector may be configured such that: the first stepped portion is configured to be engaged with a second stepped portion provided on the connector terminal so as to prevent the handle from moving in the first direction in a condition where the second lock arm is urged from the mating connector terminal and is not engaged with the stopper; and the first stepped portion is configured to be disengaged with the second stepped portion when the second lock arm is engaged with the stopper.

The lever type electrical connector may be configured such that the first stepped portion is started to be engaged with the second stepped portion, during the second end of the first lock arm is engaged with the handle.

Advantageous Effects of Invention

According to the present invention, locking of the second lever can be checked in a state where the lever type electrical connector is not "preset." Accordingly it is possible to prevent a phenomenon that a user performs an unintended operation, and erroneous insertion or disabled insertion occurs during fitting. Additionally, since the operation is easily understood by performing a control so that a user cannot perform an erroneous use, malfunction can be prevented.

According to the second invention, locking of the first lever can be checked in a state where the lever type electrical connector is not "preset." Accordingly it is possible to prevent a phenomenon where a user performs an unintended operation, and erroneous insertion or disabled insertion occurs during fitting.

According to the third invention, while the second lock arm engages with the stopper before the fitting of the mating connector, the advance of the handle can be consistently checked.

DESCRIPTION OF EMBODIMENTS

An embodiment of a lever type electrical connector according to the present invention in which a main lever is not operated in a state where the connector is not "preset" and the main lever can be operated after the connector is "preset" will be described with reference to the drawings.

Figure 1:
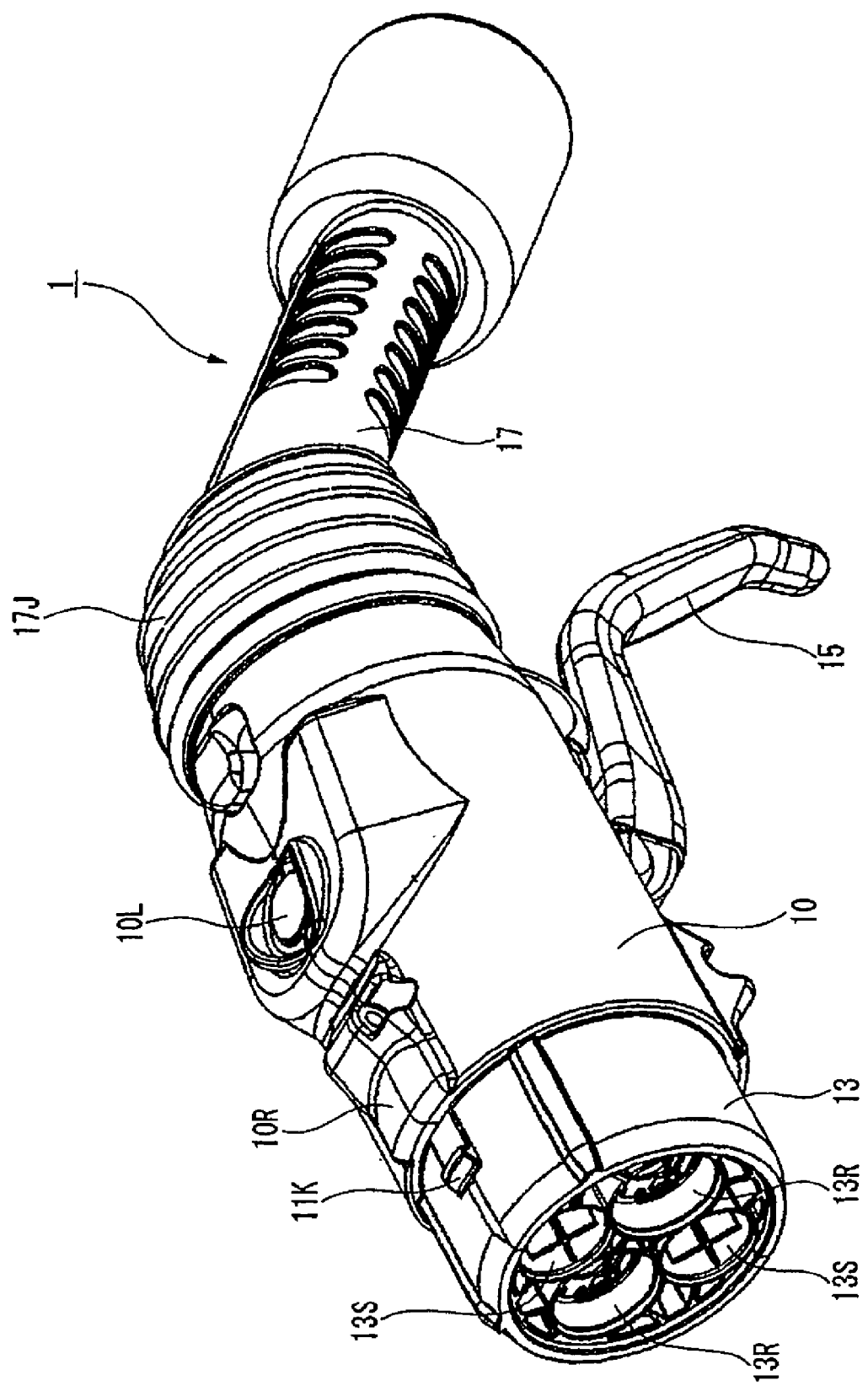
FIG. 1 is a perspective view of a male-side connector according to the present invention.

In FIG. 1, reference numeral 1 represents a male-side connector of a lever type electrical connector, and is a power-supply-side connector provided in a power supply unit. The male-side connector 1 includes a connector case 10 which is hollow inside and is formed in a substantially cylindrical shape, a lock arm 11 (a second lock arm) (FIG. 4) which is housed inside the connector case 10 and is exposed by a leading portion from an opening of the connector case 10, a semi-lock arm 12 (a first lock arm) (FIG. 4), a connector terminal 13 which is slidably disposed inside the connector case 10, a handle 14 (FIG. 5) which advances or retreats the connector terminal 13, a main lever 15 (a first lever) which advances or retreats the handle 14, a release lever 16 (a second lever) (FIGS. 3 and 4) which comes into contact with the lock arm 11 to turn the lock arm, and a grip 17 which protects the handle 14.

The connector terminal 13 is slidably built in a first half portion of the male-side connector 1, and the handle 14 which advances the connector terminal 13 exists in a second-half portion. The main lever 15 becomes operable after the connector is "preset" by the present invention. As the handle 14 (refer to FIG. 5) advances through the turning operation of the main lever 15, the front connector terminal 13 advances, is pushed with a low insertion force in the direction of a power-receiving-side connector 2 (refer to FIG. 5), and is finally fitted.

Hereinafter, the shape, structure, and functions of respective parts which allow the fitting operation of the connector according to the present invention will be described step by step.

The connector case 10 (FIG. 1, FIG. 5) is hollow inside and is formed in a substantially cylindrical shape. An upper portion of the connector base is formed with a lock arm chamber 10R (FIGS. 1 and 5), and an LED housing portion 10L (FIGS. 1 and 5) which is formed so as to swell is formed behind the lock arm chamber 10R. An LED is attached to the inside of the LED housing portion 10L to display that power is being supplied.

The lock arm 11 (FIGS. 3 and 4) is pivotably housed in the internal hollow portion of the connector case 10, and a locking piece 11K (FIGS. 1 and 4) is exposed to the outside from the opening. A release lever 16 (FIGS. 3 and 4) which comes into contact with the rear of the lock arm 11 to swing the lock arm 11 to release an engagement state is pivotably housed. Additionally, the connector terminal 13 (FIGS. 1, 4, and 5) is slidably disposed inside the connector case 10. The handle 14 (FIG. 5) which advances or retreats this connector terminal, and an end part of the main lever 15 (FIGS. 1, 2, and 4) which advances or retreats the handle 14 are also housed.

In the lock arm 11 (FIGS. 4 and 6), an intermediate portion 11P is pivotably attached to the connector case 10 by a pin, a front tip 11A extends to an outer periphery of the connector case 10 from the opening of the lock arm chamber, a hook-shaped locking piece 11K is provided at the tip of the arm so as to protrude therefrom, and the other end is formed as an acting piece 11B which extends rearward and acts on an acting arm 16A of the release lever 16.

Moreover, a stepped portion 11C which is bent in a crank shape toward the outside is formed between the intermediate portion 11P and the locking piece 11K of the tip of the lock arm. The tip 11A of the lock arm 11 is always biased to the outside by a spring.

Thus, when the acting piece 11B (FIG. 3) of the rear end of the lock arm 11 is pushed up to outside of the connector case 10 by the tip 16A of the release lever 16 (FIG. 3), the locking piece 11K of the tip of the lock arm 11 goes downward to inside of the connector case 10 so that the fitting to the female-side connector can be released. Additionally, when the tip 16A of the release lever 16 (FIG. 3) goes down, the acting piece 11B of the rear end of the lock arm 11 becomes free. Thus, the locking piece 11K of the tip of the lock arm 11 goes up by spring bias, and is fitted to the female-side connector.

In the semi-lock arm 12, an intermediate portion 12P is attached to the connector case 10 by a pin, a bulging portion 12S is provided at a front tip of the arm so as to protrude therefrom, and a bulging portion 12S is always biased to the outside by a spring. The other end 12B extends rearward, and when the other end comes into contact with a projection 14C of a distal end of the handle 14 (FIG. 8), the handle 14 cannot advance.

When the connector terminal 23 of the female-side connector 2 begins to fit to the connector terminal 13 of the male-side connector 1, the bulging portion 12S of the tip is pressed by the connector terminal 23, and turns about the pin 12P, and the other end 12B is separated from the projection 14C of the distal end of the handle 14. As a result, when the main lever 15 is operated, the handle 14 can advance.

The connector terminal 13 (FIG. 1) is cylindrical, large-diameter terminal housing chambers 13R and 13R are provided at both the right and left sides of the inside of the connector terminal so as to respectively protrude therefrom, and composite terminal housing portions 13S and 13S are provided at the upper and lower sides so as to respectively protrude from the inside thereof. A male terminal as a power supply terminal is housed in and locked to the terminal housing chamber 13R, and male terminals for signal and display control circuits are respectively housed in and locked to four cavities of the composite terminal housing chamber 13S. The connector terminal 13 is in sliding contact with the inner wall of the connector case 10.

When the main lever 15 becomes operable (FIG. 14), the main lever 15 is operated (FIG. 16), the handle 14 (FIG. 16) advances, and the connector terminal 13 combined with the handle 14 also advances in sliding contact with the inner wall of the connector case 10. Eventually, the connector terminal can move by a stroke L from a position 13' (FIG. 16) before fitting, and fit to a mating connector terminal.

The handle 14 (FIG. 5) includes a first-half straight pipe portion 14A, and a second-half oblique pipe portion 14B which is inclined in the shape of the letter V, and also serves as a protector for lead wires of the cable C.

The first-half straight pipe portion 14A is slidably supported by an open hole of the rear end of the connector case 10, and a protective case of the cable C is locked to the rear end of the oblique pipe portion 14B. A projection 14C is formed at a side surface in the vicinity of the head of the straight pipe portion 14A, and when the projection 14C comes into contact with the other end 12B (FIG. 8) of the semi-lock arm 12, the handle 14 becomes unable to advance.

The main lever 15 (FIG. 1 and FIG. 2) is formed in the shape of the letter L so that a long operating portion 15A and a short acting portion 15B intersect each other. The acting portion 15B has a long hole 15C at an intersection base thereof, and is pivoted by the lever shaft 10C (FIG. 14) at a second-half portion of the connector case 10.

Additionally, Y-shaped bifurcated supporting pieces 15D are formed at the distal end of the acting portion 15B, and each supporting piece 15D is attached by the pin 15P inserted into a shaft hole provided in the side wall of the straight pipe portion 14A of the handle 14, and an oblong hole provided in the inner wall of the connector case 10 so as to protrude therefrom.

The release lever 16 (FIG. 3) is formed in the shape of the letter L by an acting arm 16A which extends in the axial direction of the connector terminal 13, and a locking arm 16B which hangs from the other end of the acting arm 16A. An intermediate portion of the arm 16A is rotatably held by a parallel pin 16P which is interposed between the handle and a boss of the inner wall of the connector case 10 above the handle 14.

When the acting piece 11B (FIG. 3) of the rear end of the lock arm 11 is pushed up by the tip 16A of the release lever 16 (FIG. 3), the locking piece 11K of the tip of the lock arm 11 lowers so that the fitting to the female-side connector can be released. When the release lever 16 (FIG. 3) goes down, the acting piece 11B of the rear end of the lock arm 11 becomes free. Thus, the locking piece 11K of the tip of the lock arm 11 rises due to the spring bias, and is fitted to the female-side connector.

The grip 17 (FIG. 5) is made of an elastic member, such as synthetic rubber. A waterproof cap 17C is continuously formed at the front of the grip via a bellows portion 17J, and is fitted to an annular groove 10D of the rear end of the connector case 10.

Next, the outline of the manner in which the lock arm 11 and the semi-lock arm 12 enter a "preset" state when operated in a certain way, and why the main lever becomes operable when "preset" will be described with reference to FIGS. 2 to 4.

The "preset" used in the description of the lever type electrical connector according to the present invention means as follow.

(A) The lever type electrical connector 1 is inserted into the mating connector 2, and the locking piece 11K (FIG. 14) of the lock arm 11 is in the state of being locked to the lock portion 23K of the tip 23 (FIG. 14) of the female connector. Although the "preset" meant in the conventional products refers to the state up to here, the present invention further includes the following state.

(B) The bulging portion 12S (FIG. 14) of the semi-lock arm 12 (FIG. 14) is in the state (that is, the state of FIG. 14) of being pushed into a movable surface 23S (FIG. 14) of the tip 23 (FIG. 14) of the female connector.

Figure 2:
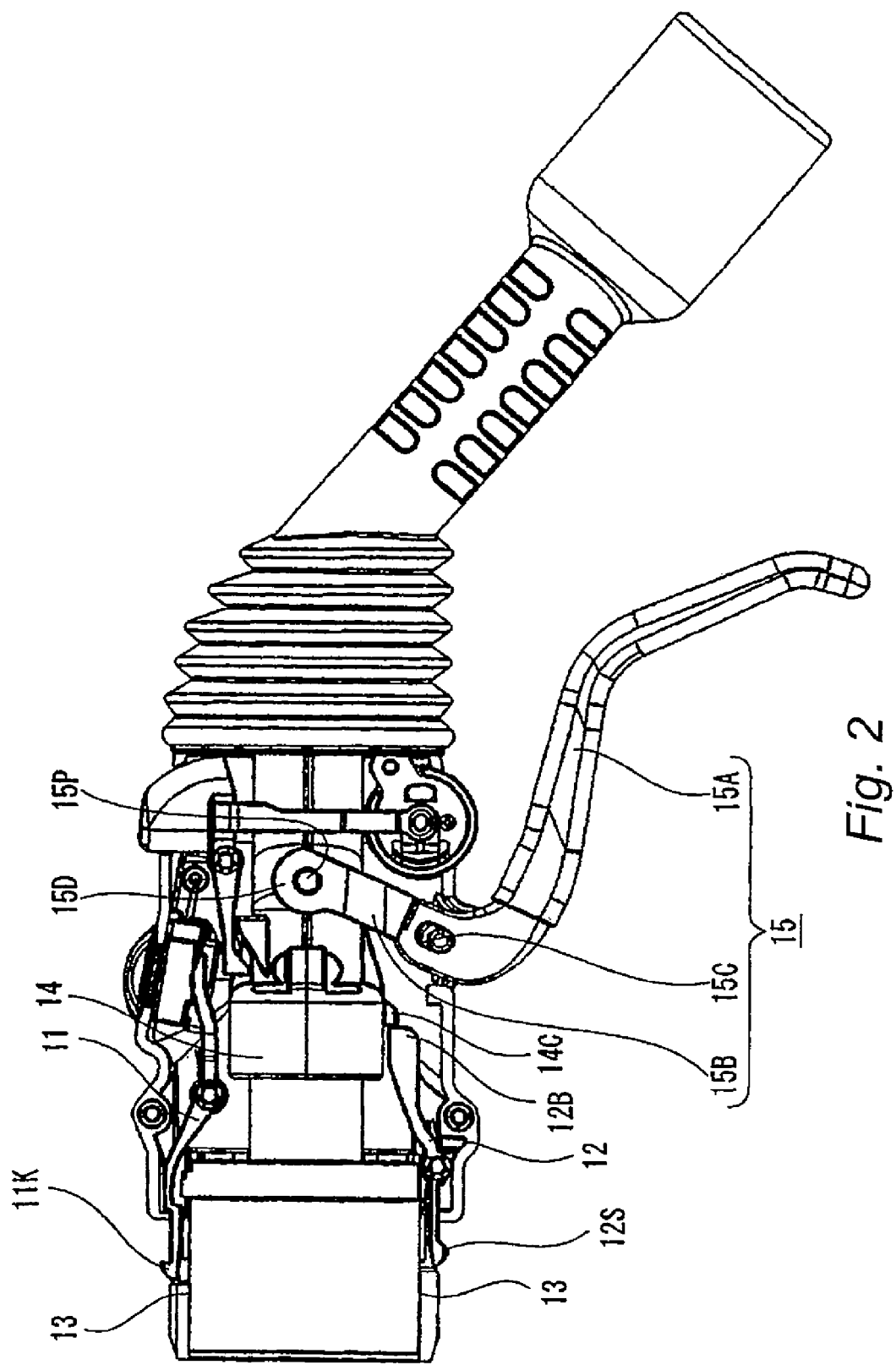
FIG. 2 is a side view showing a state where both a lock arm and a semi-lock arm of a lever type electrical connector according to the present invention do not come into contact with a mating connector.
Figure 3:
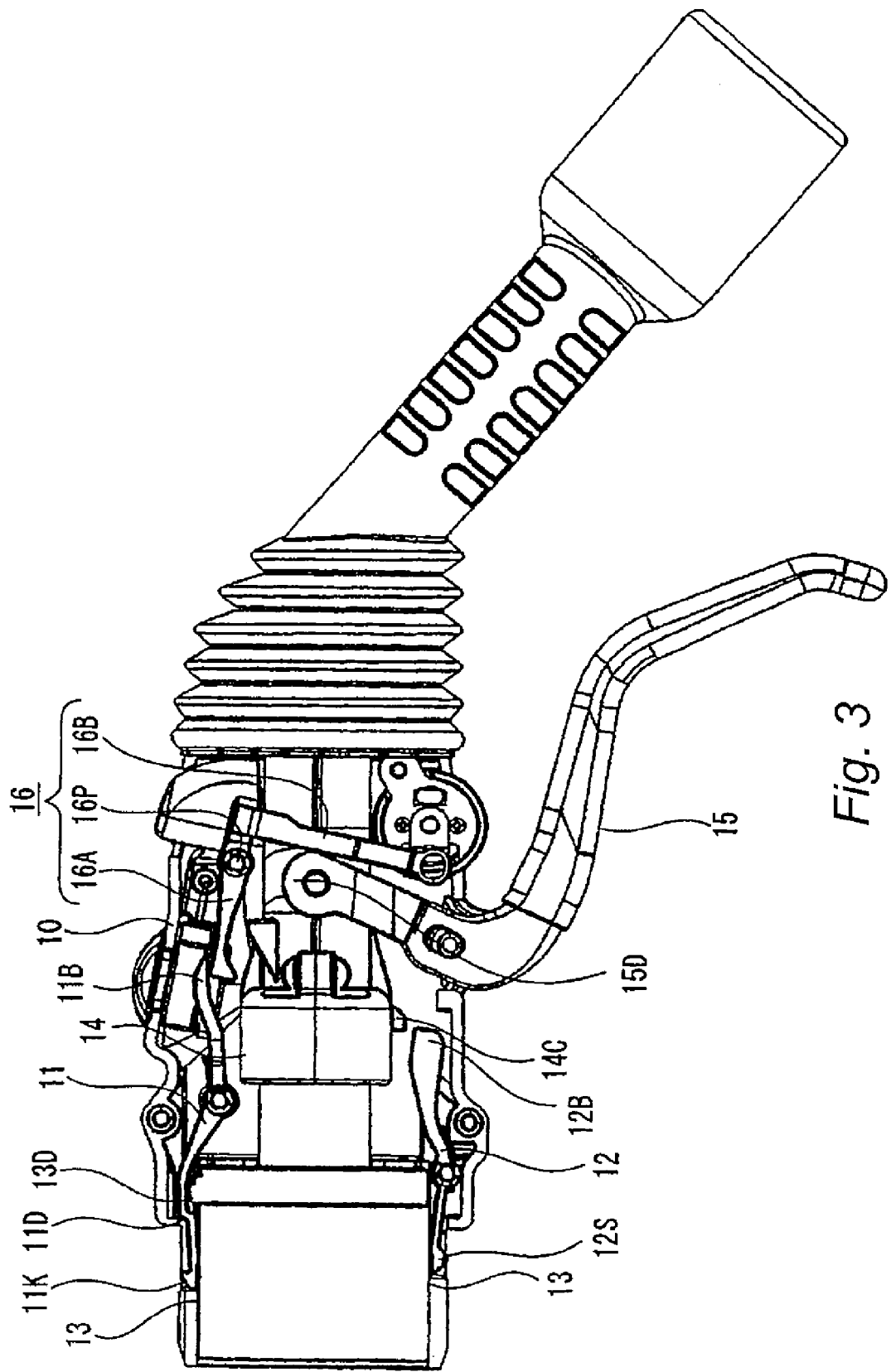
FIG. 3 is a side view showing a state where only the semi-lock arm of the lever type electrical connector shown in FIG. 2 comes into contact with the mating connector.
Figure 4:
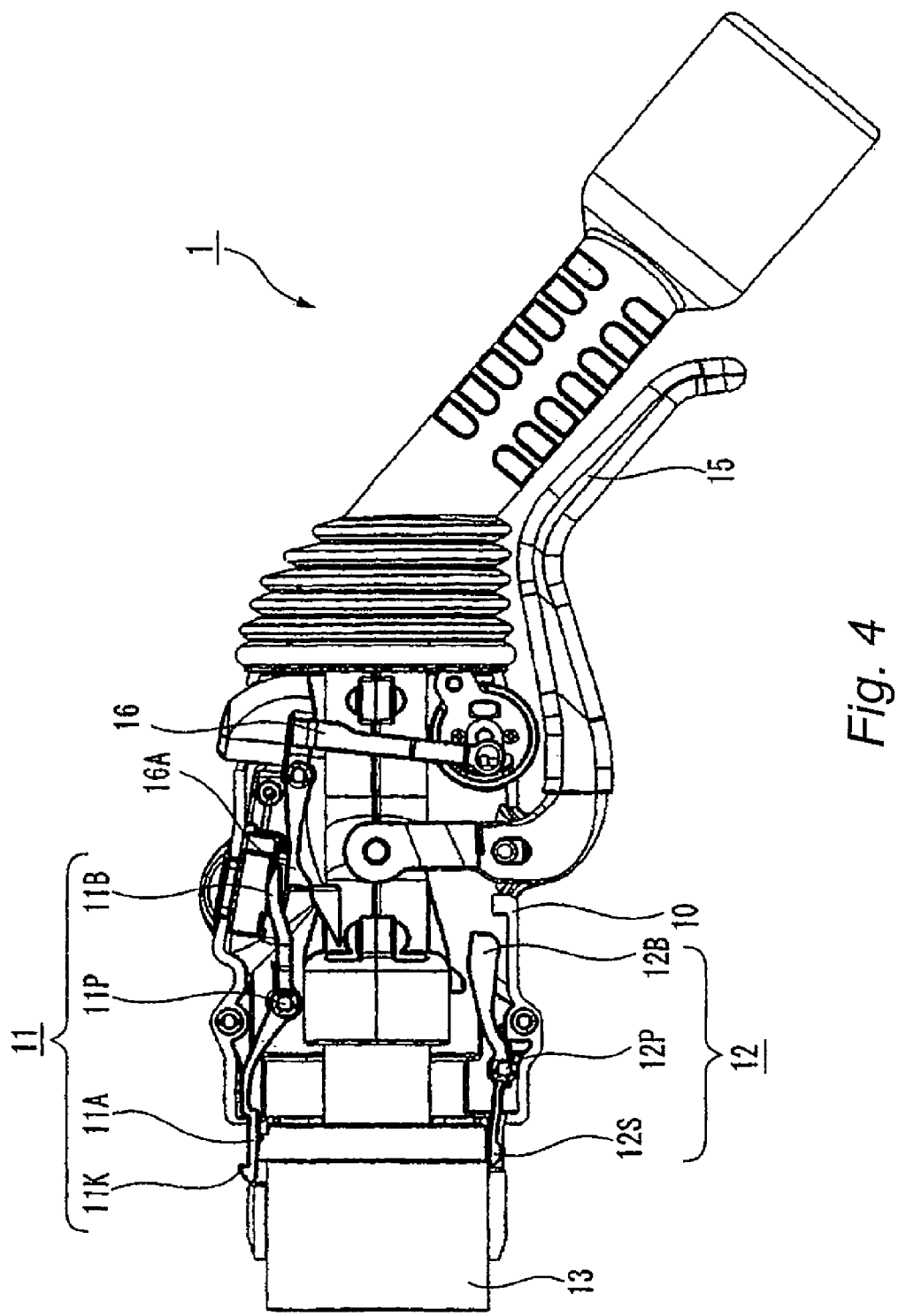
FIG. 4 is a side view showing a state where both the lock arm and the semi-lock arm of the lever type electrical connector shown in FIG. 2 come into contact with the mating connector.

FIGS. 2 to 4 are side views of the lever type electrical connector, FIG. 2 shows a state which is neither the state A nor the state B of the preset definition, FIG. 3 shows a state which is not the state A but the state B, and FIG. 4 shows the state which is both the state A and the state B (preset state).

In FIG. 2, both the locking piece 11K of the lock arm 11 and the bulging portion 12S of the tip of the semi-lock arm 12 are in the state of being separated from the surface of the connector terminal 13. In this state, the main lever does not become operable.

This is because the rear end 12B of the semi-lock arm 12 comes into contact with the projection 14C near the tip of the handle 14 to check the advance of the handle 14 (which will be described in detail later).

In FIG. 3, both the locking piece 11K of the lock arm 11 and the bulging portion 12S of the tip of the semi-lock arm 12 are in the state of being pressed by the mating connector, and being in contact with the surface of the connector terminal 13. Thus, the rear end 12B of the semi-lock arm 12 (FIG. 12) is separated from the projection 14C of the handle 14 and stops checking the advance of the handle 14. However, since a stepped portion 11D of the lock arm 11 has engaged with a body stepped portion 13D of the connector terminal 13, the main lever 15 also does not become operable in this state (which will be described in detail later).

In FIG. 4, the locking piece 11K of the lock arm 11 is again separated from the surface of the connector terminal 13, and the bulging portion 12S of the tip of the semi-lock arm 12 is pressed by the mating connector. Thus, similarly to FIG. 3, the advance of the handle 14 is checked. Accordingly, the main lever 15 becomes operable, the main lever 15 is operated as in FIG. 4, and the connector terminal 13 advances as shown in the drawing (which will be described in detail later).

Next, a series of operations until a mating connector is finally fitted to the lever type electrical connector will be described in detail with reference to FIGS. 5 to 16.

Figure 5:
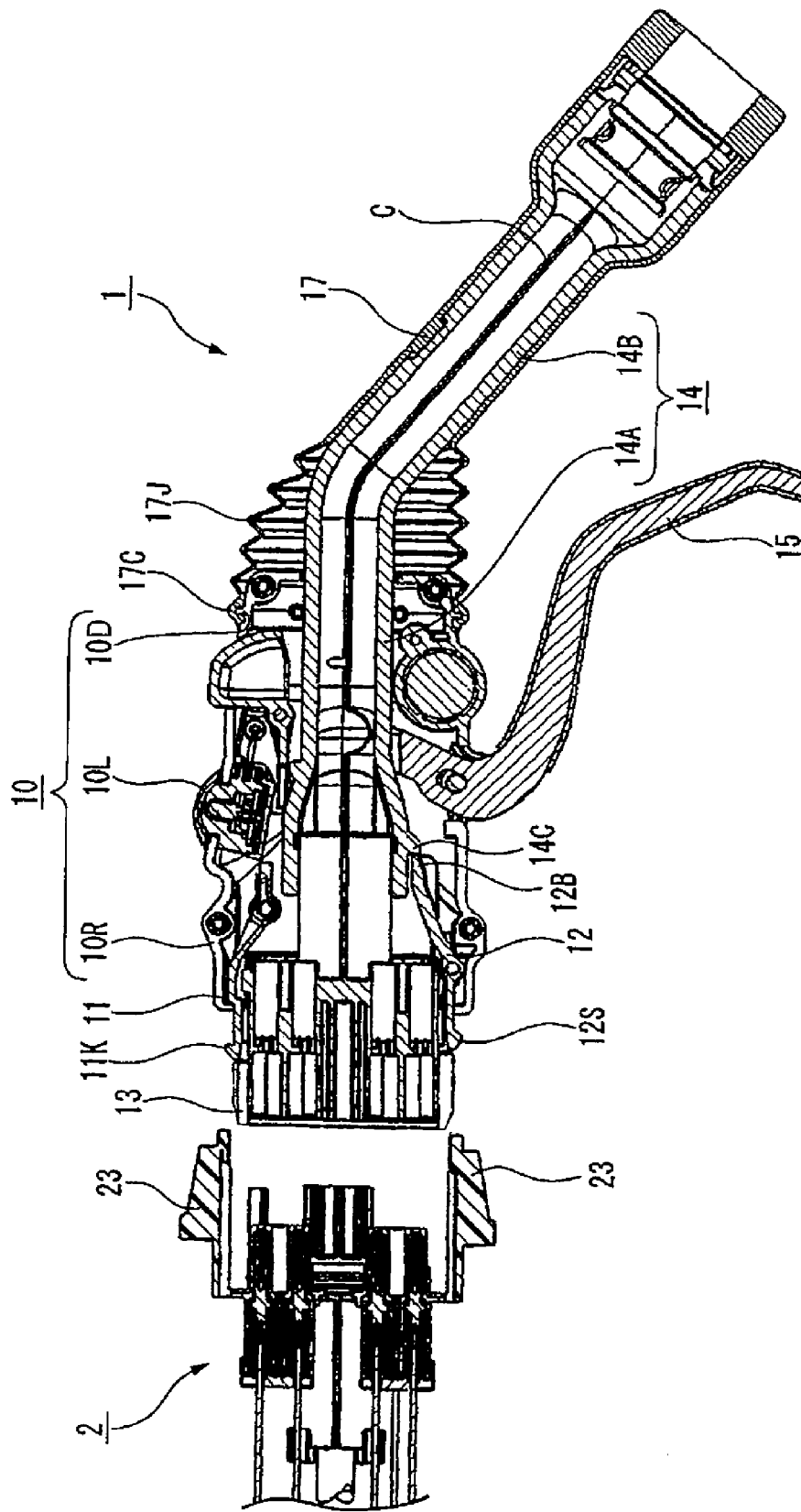
FIG. 5 is a longitudinal sectional view showing a state where the male-side connector and a female-side connector are still separated from each other.
Figure 6:
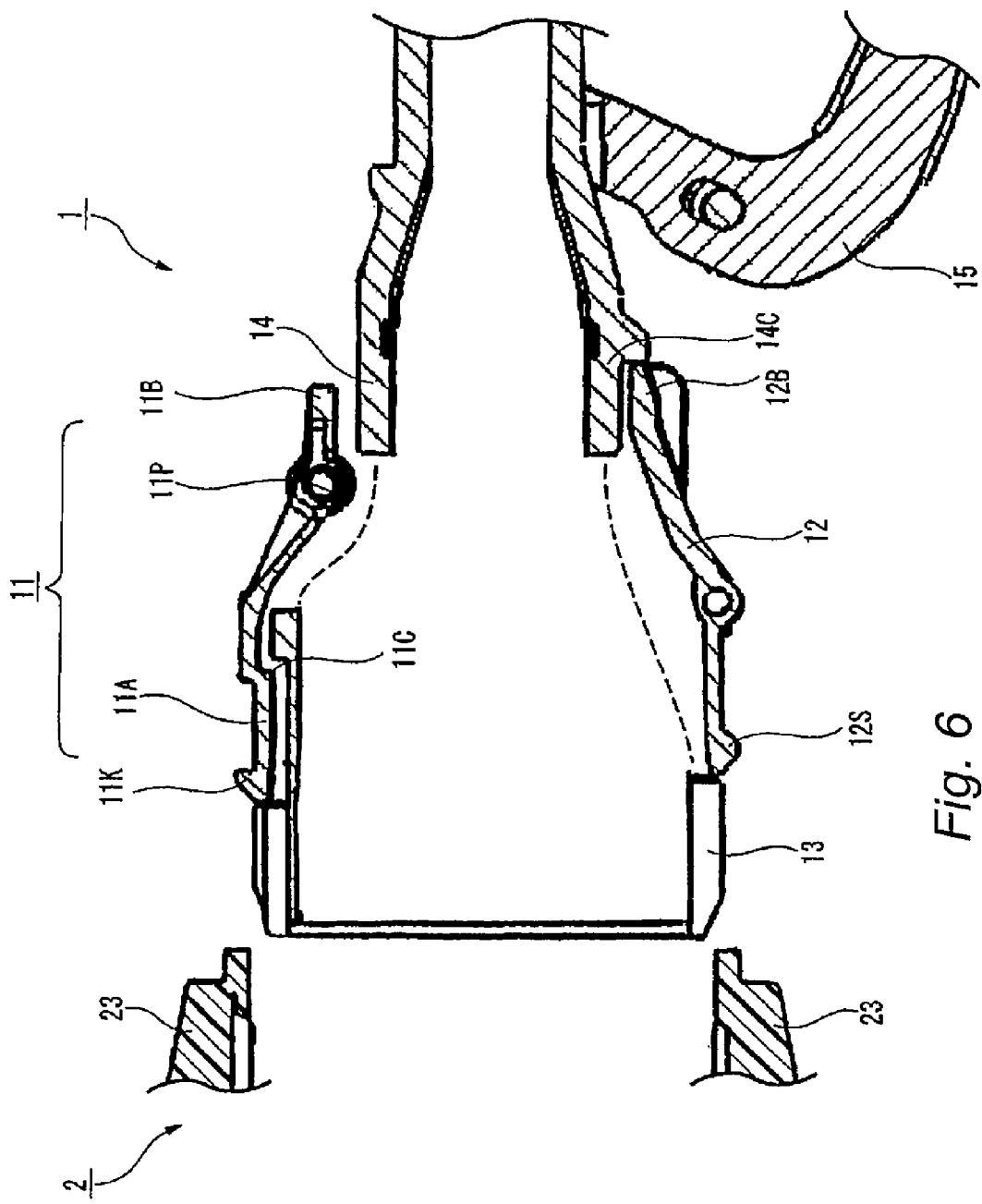
FIG. 6 is an enlarged sectional view of chief parts of FIG. 5.

FIGS. 5 and 6 are drawings showing a state where the male-side connector 1 and the female-side connector 2 are separated from each other. FIG. 5 is a longitudinal sectional view, and FIG. 6 is an enlarged sectional view of chief parts.

In both the drawings, the connector terminal 13 of the male-side connector 1 and the connector terminal 23 of the female-side connector 2 are still separated from each other. Accordingly, the bulging portion 12S of the tip of the semi-lock arm 12 of FIG. 6, which is always biased to the outside, is still not pressed by the connector terminal 23 of the female-side connector 2. Therefore, the rear end 12B of the semi-lock arm 12 comes into contact with the projection 14C in the vicinity of the tip of the handle 14 to check the advance of the handle 14. In this state, the main lever 15 cannot be operated even if a person tries to operate the main lever. The connector terminal 13 and the handle 14 are mechanically coupled to each other, and when the handle 14 is advanced, the connector terminal 13 also advances. When the mechanical coupling is drawn on a drawing, it is difficult to see the mechanical coupling. Thus, the fact that the connector terminal 13 and the handle 14 are in a mechanical coupling relation is shown by dotted lines in the drawing with both connected to each other (this is also the same in the following drawings).

Figure 7:
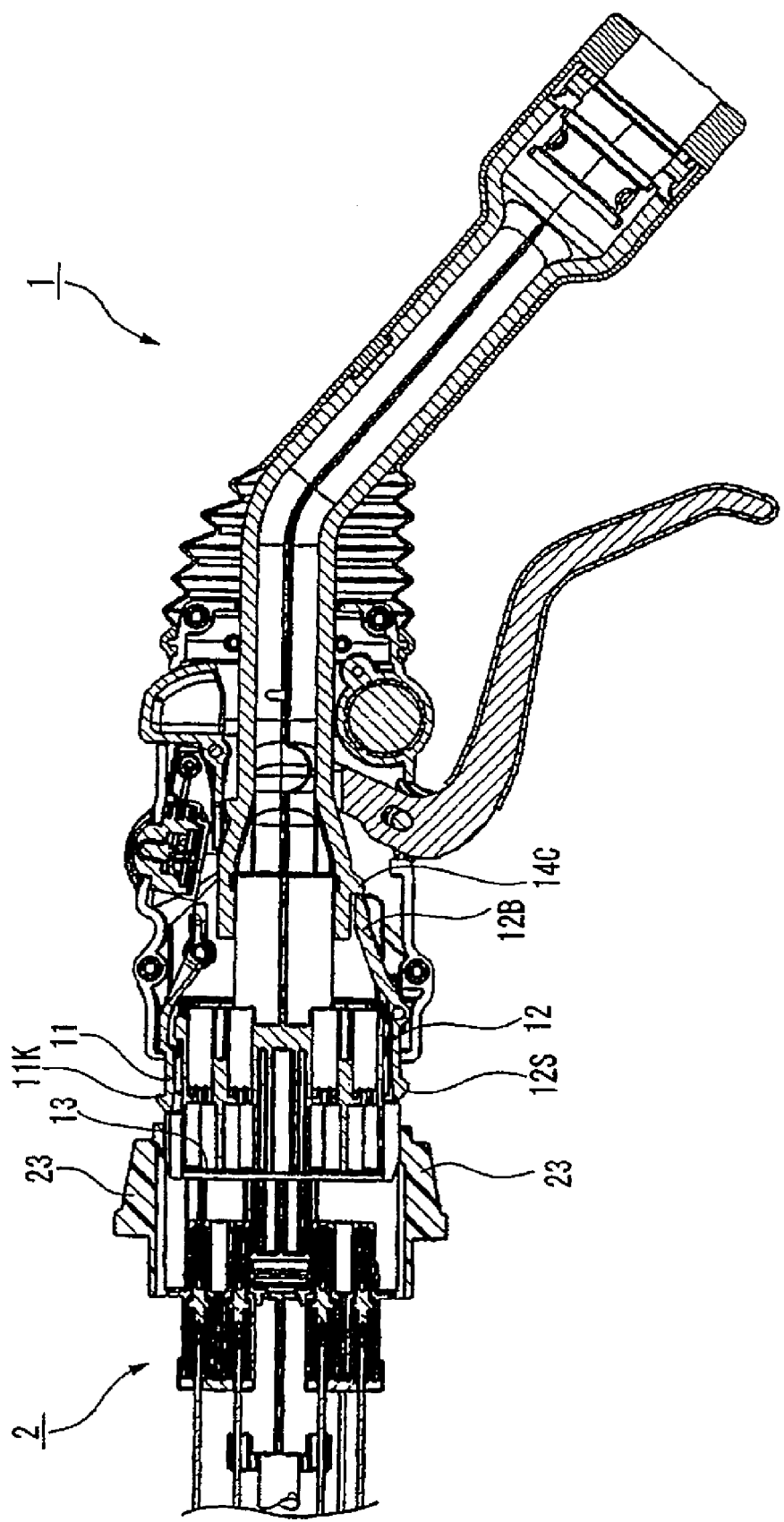
FIG. 7 is a longitudinal sectional view showing a state where neither a lock portion of the lock arm nor a bulging portion of the tip of the semi-lock arm is pressed by a female-side connector terminal, although the male-side connector and the female-side connector have come into contact with each other.
Figure 8:
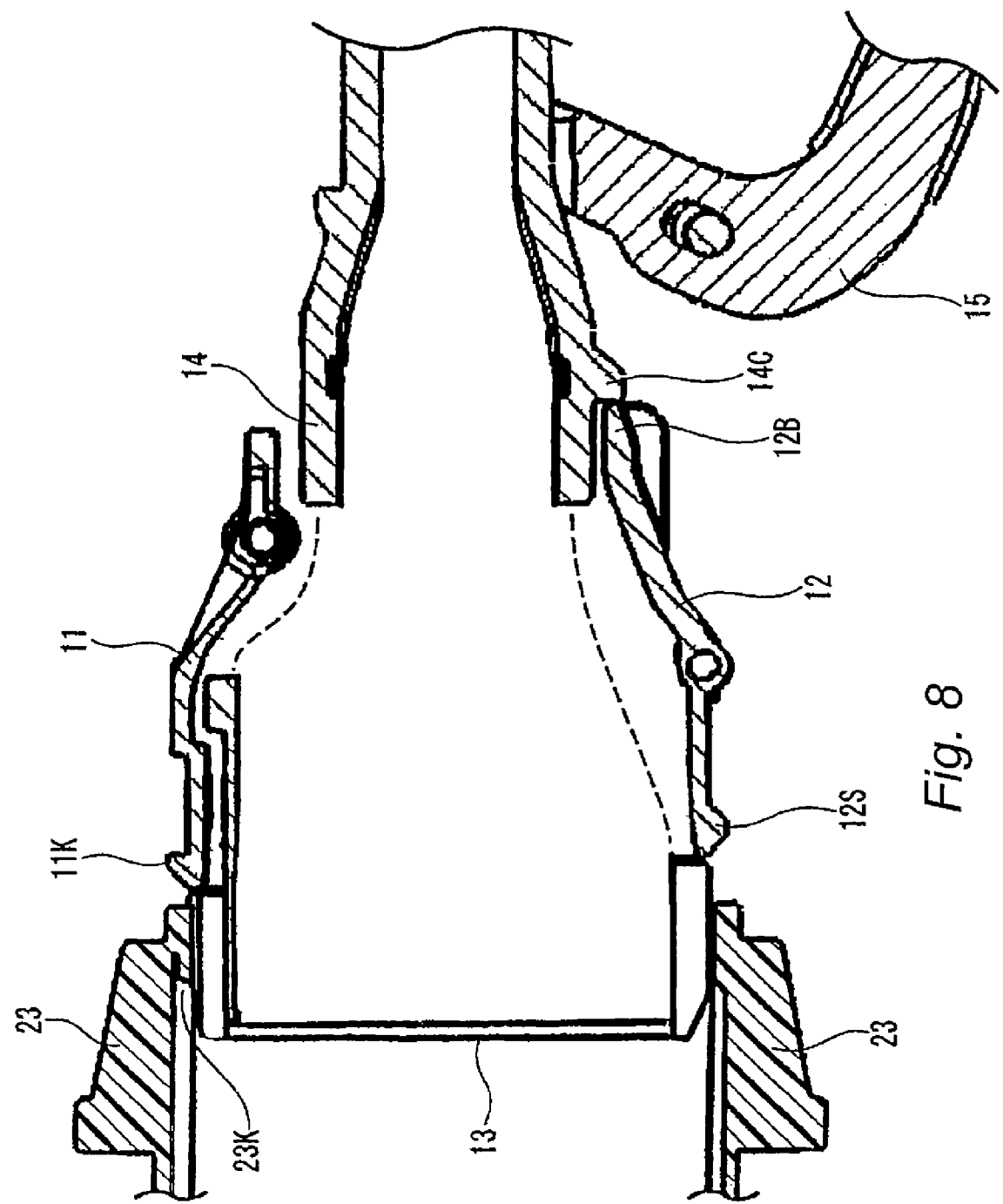
FIG. 8 is an enlarged sectional view of chief parts of FIG. 7.

FIGS. 7 and 8 are views showing a state where neither the locking piece 11K of the lock arm 11 nor the bulging portion 12S of the tip of the semi-lock arm 12 is pressed by the female-side connector terminal 23, although the male-side connector 1 and the female-side connector 2 have come into contact with each other. FIG. 7 is a longitudinal sectional view, and FIG. 8 is an enlarged sectional view of chief parts.

in both the drawings, although the connector terminal 13 of the male-side connector 1 and the connector terminal 23 of the female-side connector 2 come into contact with each other, neither the locking piece 11K of the lock arm 11 nor the bulging portion 12S of the tip of the semi-lock arm 12 is pressed by the female-side connector terminal 23.

Accordingly, since the bulging portion 12S of the semi-lock arm 12 of FIG. 8 is still not pressed by the connector terminal 23 of the female-side connector 2, similarly to FIG. 6, the rear end 12B of the semi-lock arm 12 comes into contact with the projection 14C in the vicinity of the tip of the handle 14 to check the advance of the handle 14. In this state, the main lever 15 cannot be operated even if a person tries to operate the main lever.

Figure 9:
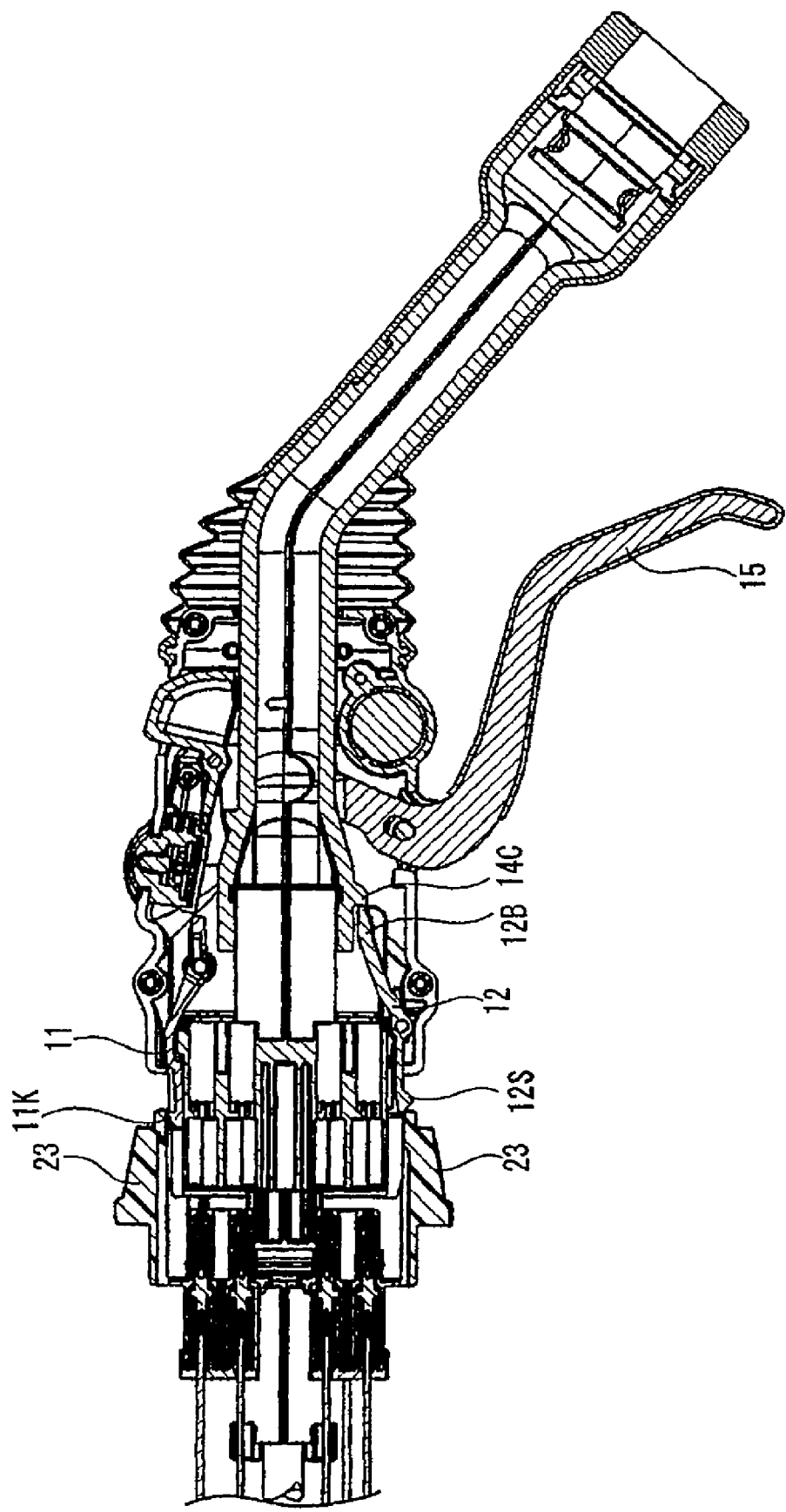
FIG. 9 is a longitudinal sectional view showing a state where the bulging portion of the tip of the semi-lock arm is not yet pressed by the female-side connector terminal, although the male-side connector and the female-side connector have come into contact with each other, and the lock portion of the lock arm has been pressed by the female-side connector terminal.
Figure 10:
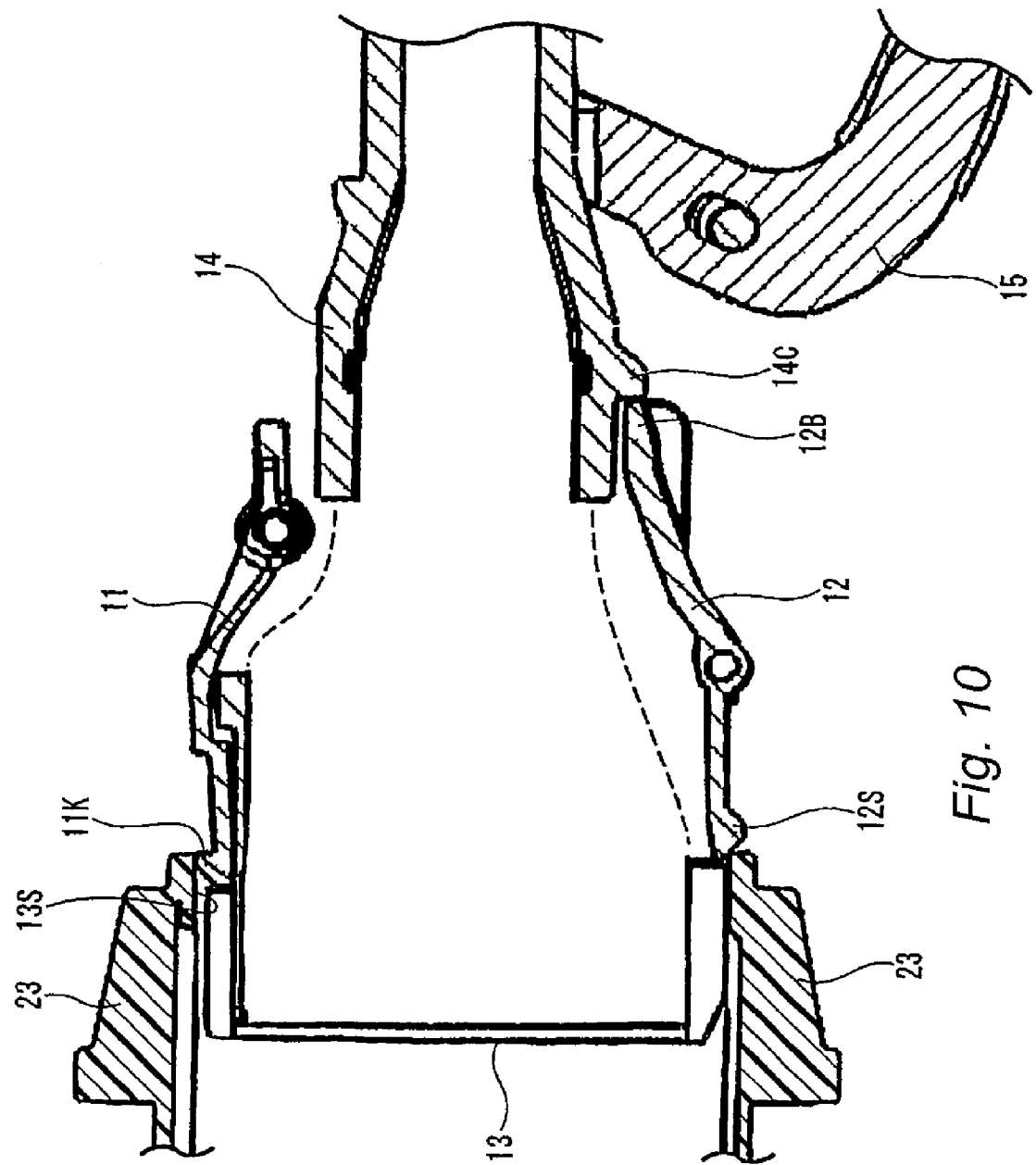
FIG. 10 is an enlarged sectional view of chief parts of FIG. 9.

FIGS. 9 and 10 are views showing a state where the bulging portion 12S of the tip of the semi-lock arm 12 is not yet pressed, although the male-side connector 1 and the female-side connector 2 have come into contact with each other and the locking piece 11K of the lock arm 11 has been pressed by the female-side connector terminal 23. FIG. 9 is a longitudinal sectional view, and FIG. 10 is an enlarged sectional view of chief parts.

Since the bulging portion 12S of the semi-lock arm 12 of FIG. 10 is still not pressed by the connector terminal 23 of the female-side connector 2, similarly to FIG. 6, the rear end 12B of the semi-lock arm 12 comes into contact with the projection 14C in the vicinity of the tip of the handle 14 to check the advance of the handle 14. In this state, the main lever 15 cannot be operated even if a person tries to operate the main lever.

In addition, since the locking piece 11K of the lock arm 11 has been pressed by the female-side connector terminal 23, in this state, the operation of the main lever 15 is also checked by the lock arm 11. The reason will be described with reference to FIGS. 11 and 12.

Figure 11:
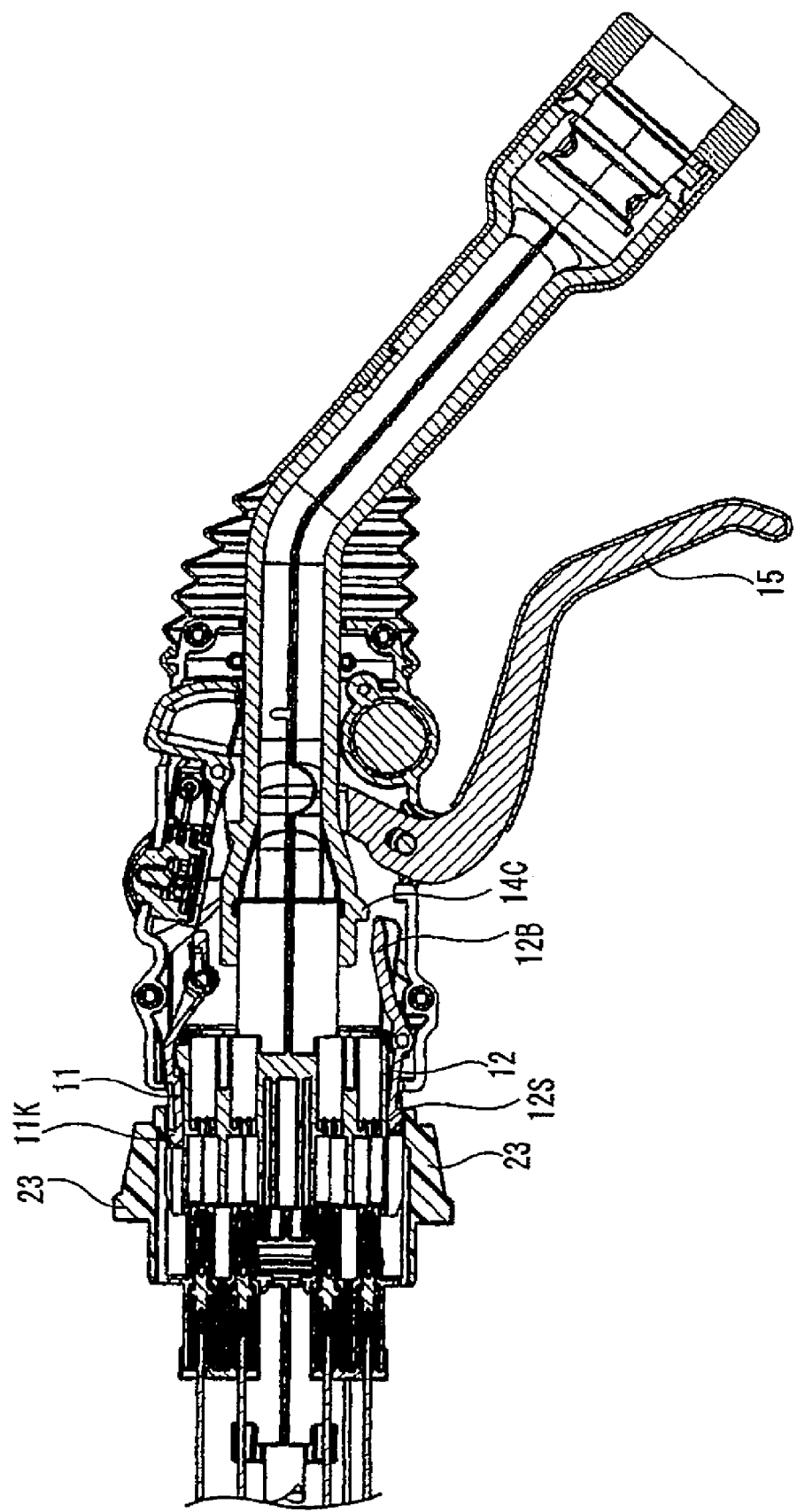
FIG. 11 is a longitudinal sectional view showing a state where both the lock portion of the lock arm and the bulging portion of the tip of the semi-lock arm have been pressed by the female-side connector terminal.
Figure 12:
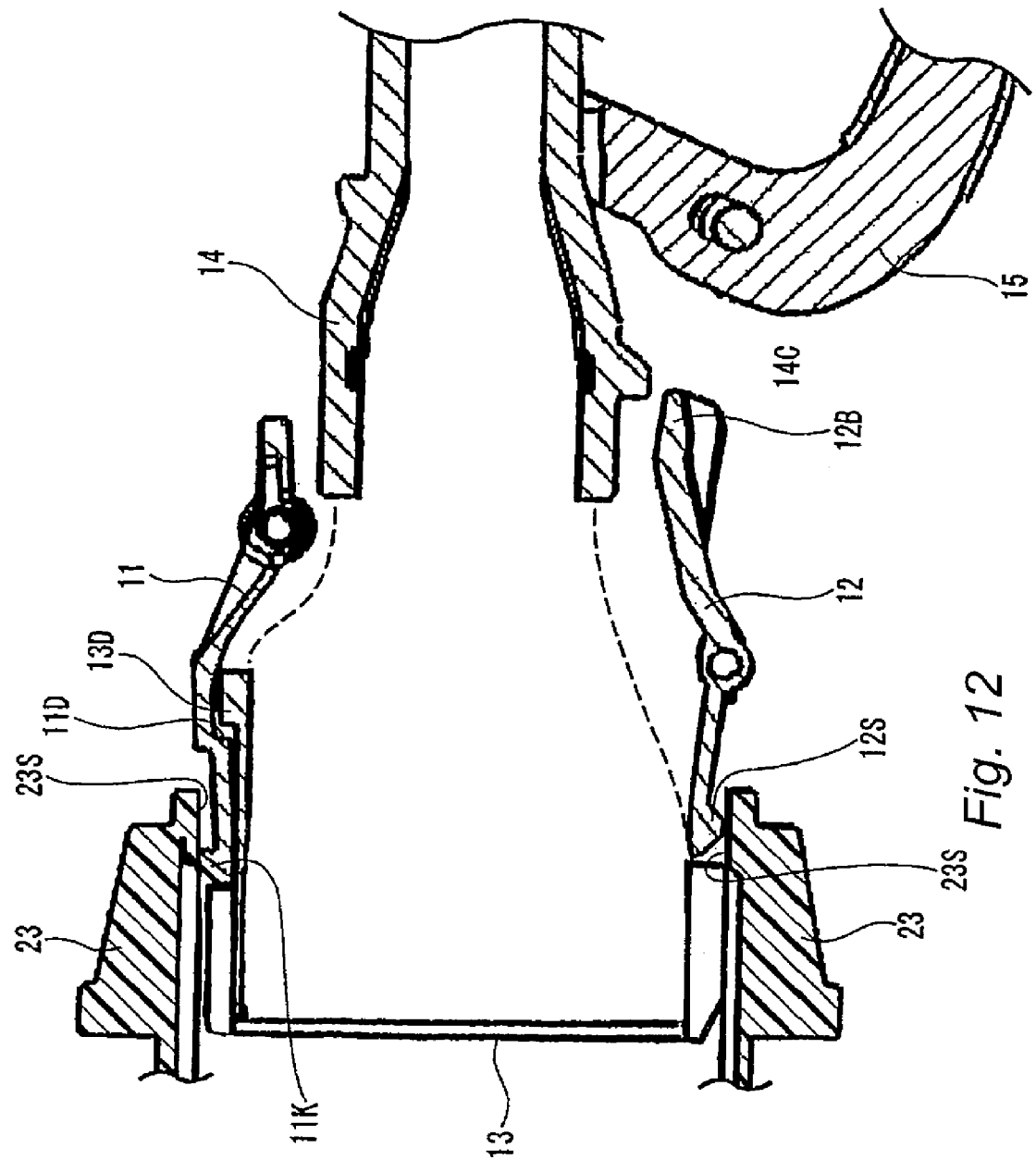
FIG. 12 is an enlarged sectional view of chief parts of FIG. 11.

FIGS. 11 and 12 are views showing a state where the lock portion 11K of the lock arm 11 and the bulging portion 12S of the tip of the semi-lock arm 12 have been pressed by the female-side connector terminal 23. FIG. 11 is a longitudinal sectional view, and FIG. 12 is an enlarged sectional view of chief parts.

In both the drawings, since the bulging portion 12S of the semi-lock arm 12 has been pressed by the connector terminal 23 of the female-side connector 2, the rear end 12B of the semi-lock arm 12 is separated from the projection 14C in the vicinity of the tip of the handle 14 to free the handle 14 to advance. However, since the locking piece 11K of the lock arm 11, as shown in FIG. 12, has been pressed by the female-side connector terminal 23, the locking piece 11K sinks. In this sunken state, the stepped portion 11D of the lock arm 11 will similarly engage with the body stepped portion 13D of the connector terminal 13. Therefore, even if the connector terminal 13 tries to advance, the body stepped portion 13D is caught by the stepped portion 11D of the lock arm 11, and is not able to advance. Accordingly, the main lever 15 does not become operable.

In other words, the stepped portion 11D is started to be engaged with the body stepped portion 13D, during the rear end 12B of the semi-lock arm 12 is engaged with the handle 14.

Figure 13:
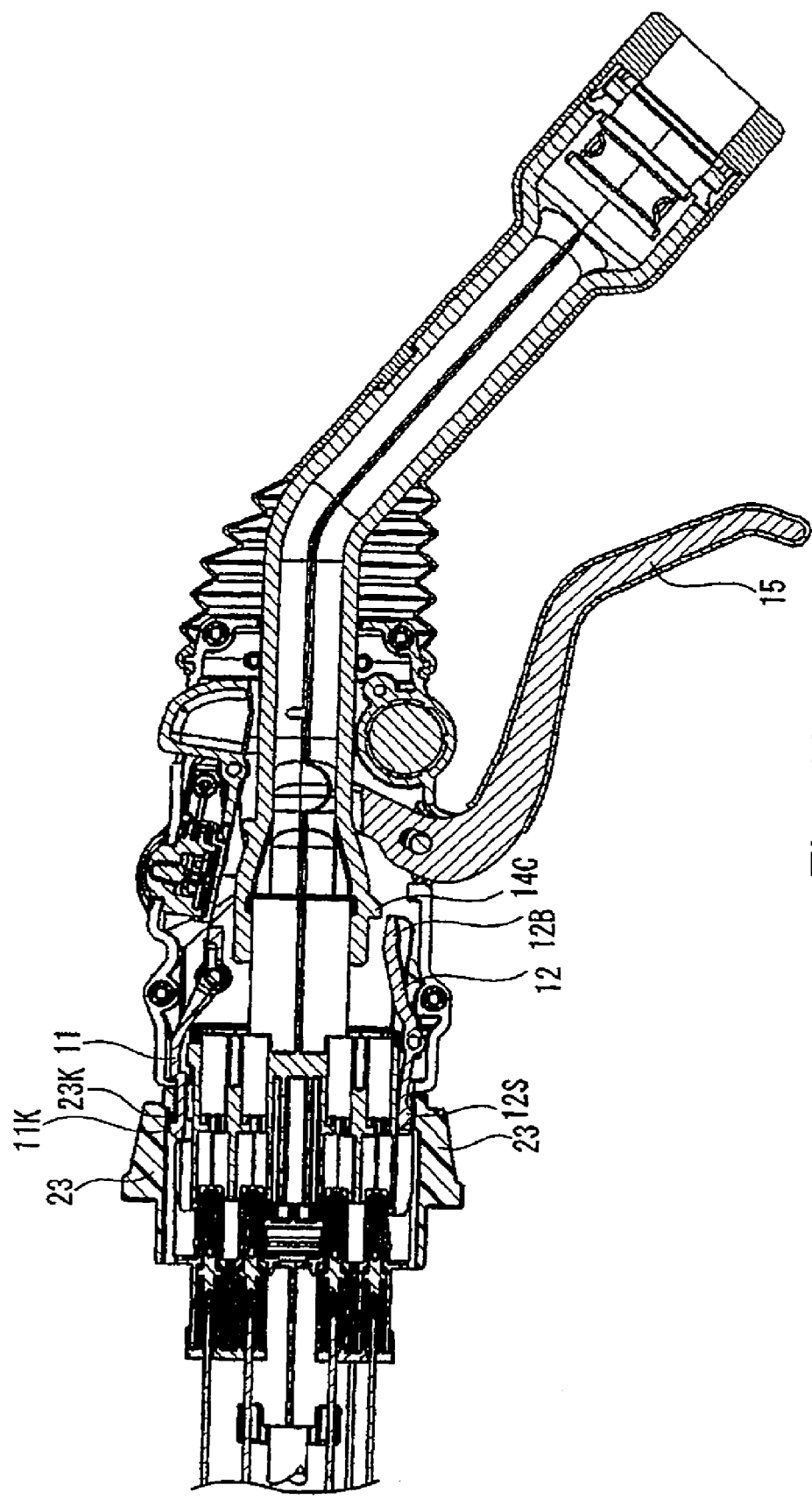
FIG. 13 is a longitudinal sectional view showing a "preset" state where the lock portion of the lock arm has engaged with the lock which is a "stopper" of the female-side connector terminal, and the bulging portion of the tip of the semi-lock arm has been pressed by the female-side connector terminal.
Figure 14:
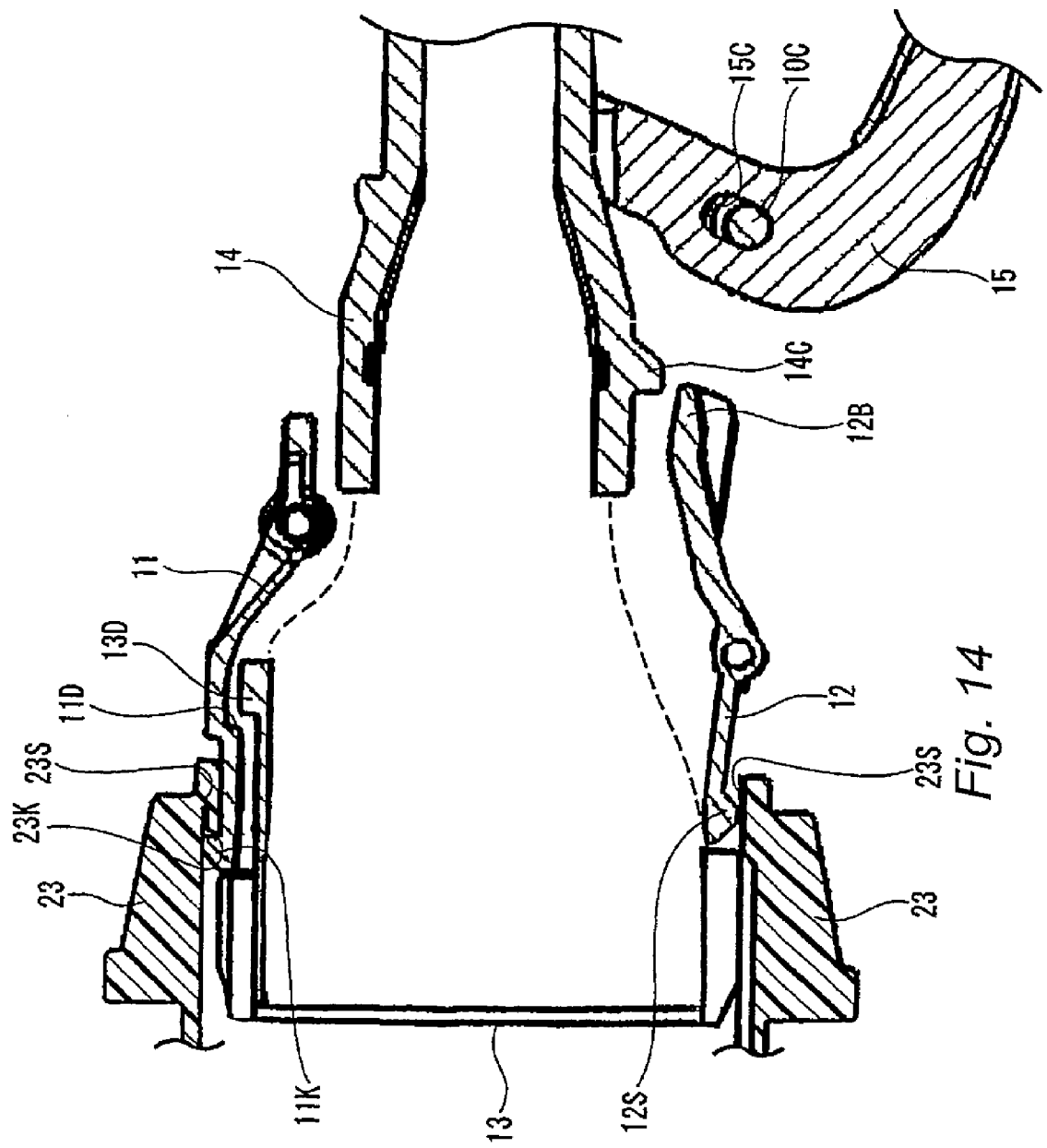
FIG. 14 is an enlarged sectional view of chief parts of FIG. 13.

FIGS. 13 and 14 are views showing a state (i.e., the "preset" state in the present invention) where the locking piece 11K of the lock arm 11 has engaged with the lock portion 23K which is a "stopper" of the female-side connector terminal 23, and the bulging portion 12S of the tip of the semi-lock arm 12 has been pressed by the female-side connector terminal 23. FIG. 13 is a longitudinal sectional view, and FIG. 14 is an enlarged sectional view of chief parts.

In both the drawings, since the locking piece 11K of the lock arm 11 has engaged with the lock portion 23K which is a "stopper" of the female-side connector terminal 23, the locking piece 11K of the lock arm 11 is no longer pressed by the female-side connector terminal 23. Therefore, the locking piece is separated from the connector terminal 13, and the engagement between the stepped portion 11D of the lock arm 11 and the body stepped portion 13D of the connector terminal 13 is released.

Additionally, since the rear end 12B of the semi-lock arm 12 is already separated from the projection 14C near the tip of the handle 14, the handle 14 is freed to advance.

Accordingly, there is no member which checks the advance of the handle 14 in the advancing direction, and the main lever 15 becomes operable.

Figure 15:
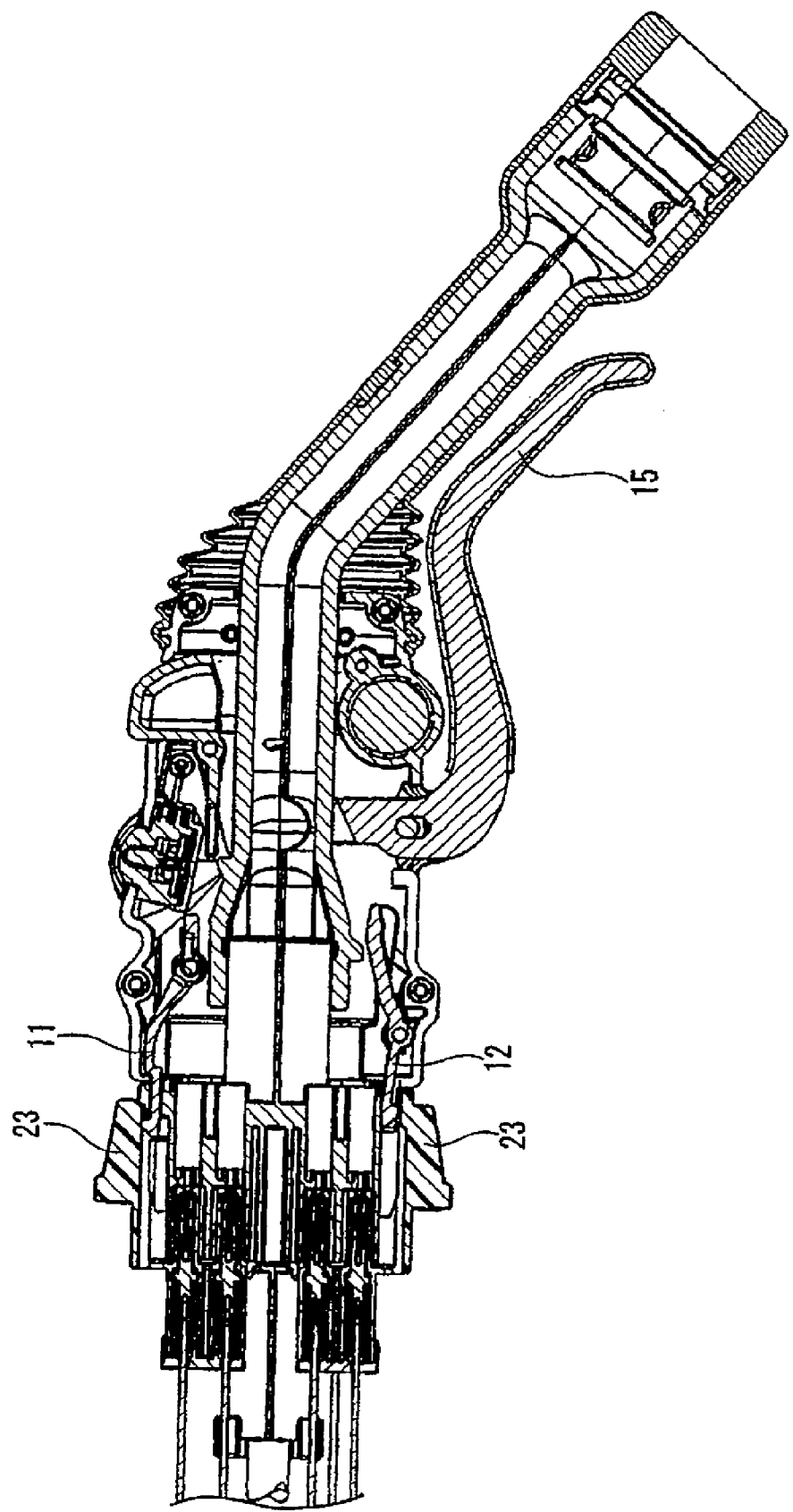
FIG. 15 is a longitudinal sectional view showing a state where the "preset" state is brought about and a main lever has actually been operated.
Figure 16:
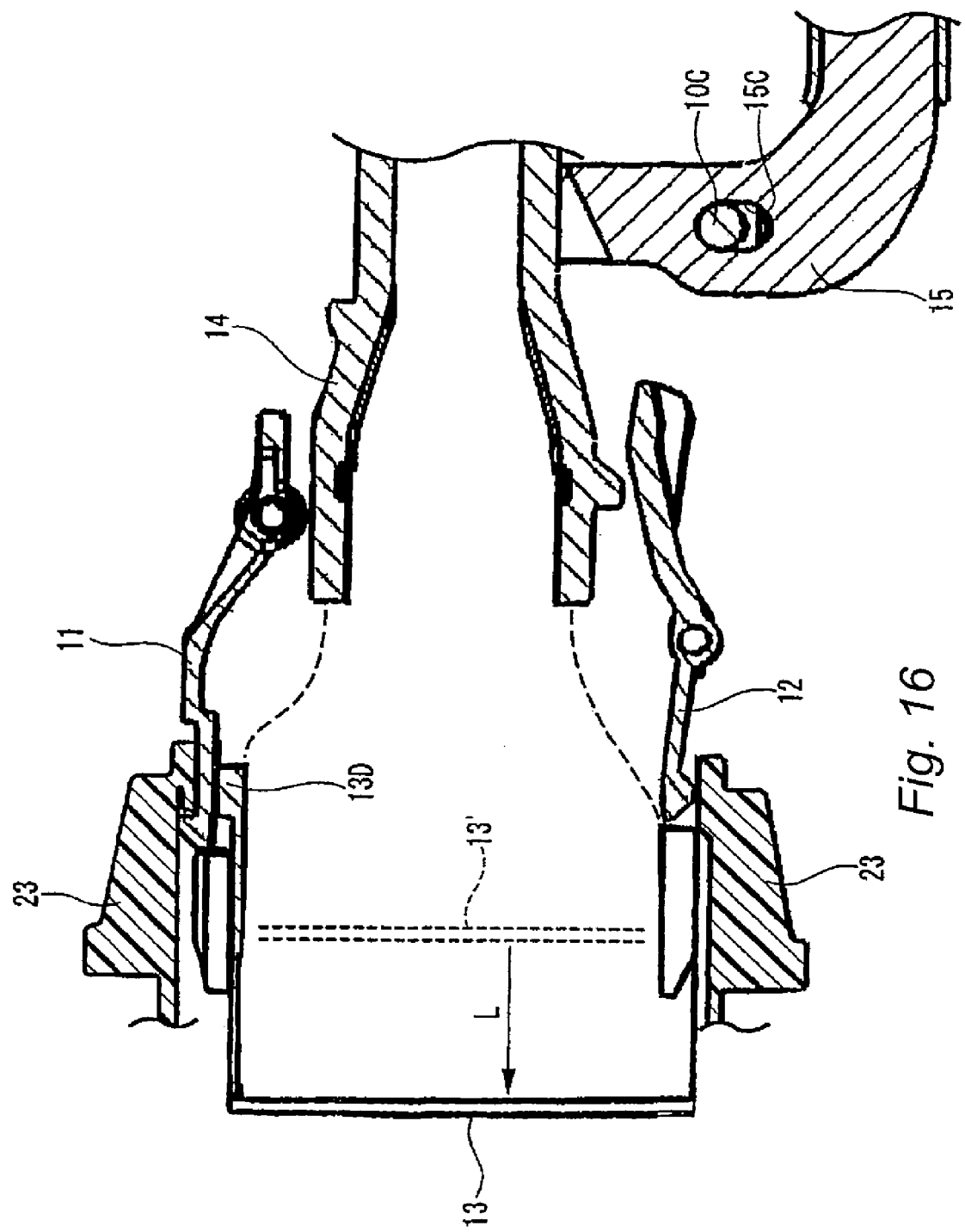
FIG. 16 is an enlarged sectional view of chief parts of FIG. 15.
Figure 17:
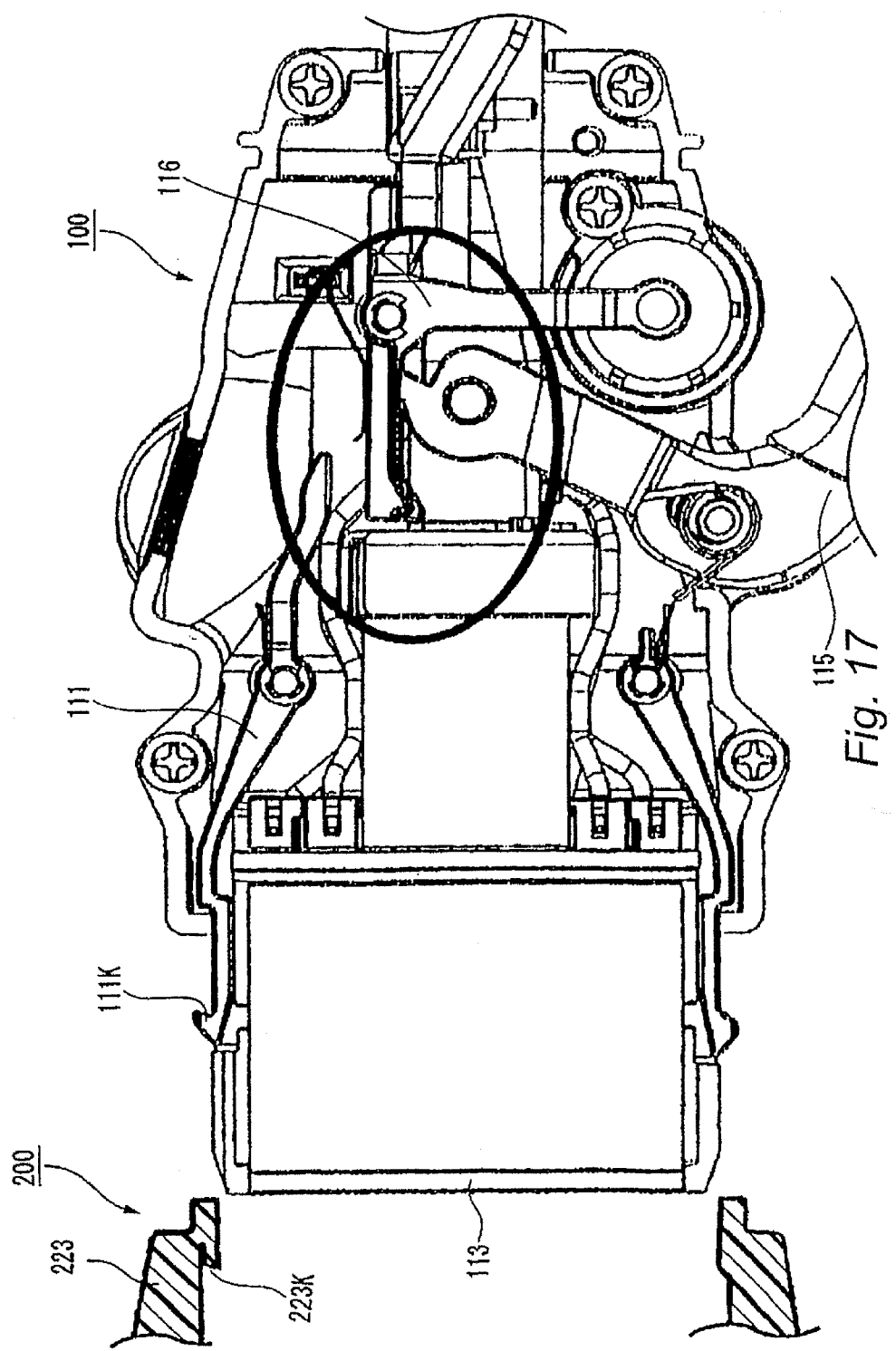
FIG. 17 is a longitudinal sectional view of chief parts showing a state before a lever type electrical connector of PTL 2 is engaged.
Figure 18:
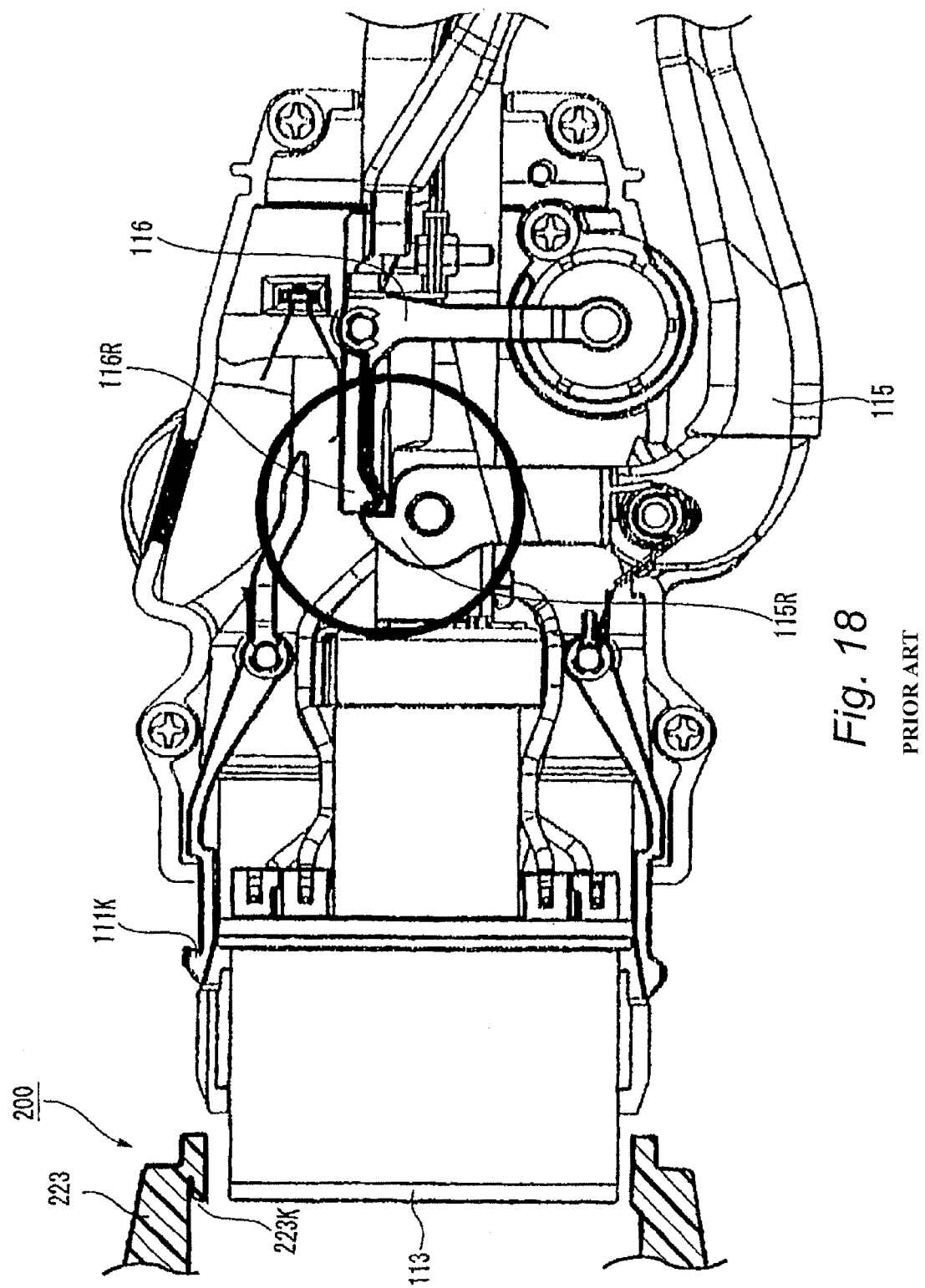
FIG. 18 is a longitudinal sectional view of chief parts after the lever type electrical connector shown in FIG. 17 is engaged.

FIGS. 15 and 16 are drawings showing a state where the main lever 15 becomes operable in the "preset" state, and the main lever 15 has actually been operated, FIG. 15 is a longitudinal sectional view, and FIG. 16 is an enlarged sectional view of chief parts.

In both the drawings, when the main lever 15 has been operated, the connector terminal 13 (FIG. 16) advances in sliding contact with the inner wall of the connector case 10, moves by the stroke L from the position 13' before fitting, and finally fits to the mating connector terminal.

As described above, according to the present invention, the semi-lock arm is pivotably housed in the connector case, the rear end of the semi-lock arm checks the advance of the handle when the other connector does not press the tip of the semi-lock arm, and the rear end of the semi-lock arm frees the handle to advance when the other connector has pressed the tip of the semi-lock arm. Thus, the locking of the main lever can be checked in a state where the lever type electrical connector is not "preset." Accordingly it is possible to prevent a phenomenon where a user performs an unintended operation, and erroneous insertion or disabled insertion occurs during fitting. Additionally, since operation is easily understood by performing a control so that a user cannot perform an erroneous use, malfunction can be prevented.

The present application is based on Japanese Patent Application No. 2009-140422 filed on Jun. 11, 2009, the contents of which are incorporated herein for reference.

INDUSTRIAL APPLICABILITY

The present invention is extremely useful in forming the lever type electrical connector capable of preventing any damage, etc. to the connector caused by the erroneous operation of the main lever.

REFERENCE SIGNS LIST 1 male-side connector of lever type electrical connector
10 connector case
10C lever shaft
10D annular groove
10L led housing portion
10R lock arm chamber
11 lock arm
11A front tip
11B acting piece
11C stepped portion
11P intermediate portion (fulcrum)
11K locking piece
12 semi-lock arm
12B other end of arm
12P intermediate portion of arm
12S bulging portion
13 connector terminal
13R terminal housing chamber
13S composite terminal housing chamber
14 handle
14A straight pipe portion
14B oblique pipe portion
14C handle projection
15 main lever
15A operating portion
15B acting portion
15C long hole
15P pin
16 release lever
16A acting arm
16B locking arm
16P parallel pin
17 grip
17C waterproof cap
17J bellows portion
2 female-side connector of lever type electrical connector
23 tip of female connector
23K lock portion

The invention claimed is:

1. A lever type electrical connector, comprising:
a case;
a connector terminal provided in the case so as to be slidable in a first direction, and configured to engage with a mating connector terminal by being moved in the first direction;
a handle connected with the connector terminal;
a first lever pivotably attached to the case, connected to the handle, and configured to be moved so as to move the handle in the first direction; and
a first lock arm pivotably attached to the case,
wherein a first end of the first lock arm is configured to come in contact with the mating connector terminal,
wherein a second end of the first lock arm opposite to the first end is configured to be disengaged from the handle when the first end is urged from the mating connector terminal, and
wherein the second end is configured to be engaged with the handle so as to prevent the handle from moving in the first direction when the first end is not urged from the mating connector terminal.

2. The lever type electrical connector as set forth in claim 1, further comprising:
a second lock arm pivotably attached to the case, configured to be engaged with a stopper provided in the mating connector terminal, configured to be disengaged from the stopper by a movement of a second lever provided in the case, and having a first stepped portion,
wherein the first stepped portion is configured to be engaged with a second stepped portion provided on the connector terminal so as to prevent the handle from moving in the first direction in a condition where the second lock arm is urged from the mating connector terminal and is not engaged with the stopper, and
wherein the first stepped portion is configured to be disengaged with the second stepped portion when the second lock arm is engaged with the stopper.

3. The lever type electrical connector as set forth in claim 2, wherein:
the first stepped portion is started to be engaged with the second stepped portion, during the second end of the first lock arm is engaged with the handle.

* * * * *